(12) United States Patent
Wang et al.

(10) Patent No.: US 9,560,279 B2
(45) Date of Patent: Jan. 31, 2017

(54) CAMERA DEVICE AND PROJECTOR DEVICE HAVING PROTECTIVE LENS

(71) Applicant: TERA XTAL TECHNOLOGY CORPORATION, Hsinchu (TW)

(72) Inventors: Wei-Hsiang Wang, Hsinchu (TW); Chen-Hui Wu, Hsinchu (TW)

(73) Assignee: TERA XTAL TECHNOLOGY CORPORATION, Hsinchu (TW)

( * ) Notice: Subject to any disclaimer, the term of this patent is extended or adjusted under 35 U.S.C. 154(b) by 194 days.

(21) Appl. No.: 14/506,518

(22) Filed: Oct. 3, 2014

(65) Prior Publication Data

US 2015/0022705 A1    Jan. 22, 2015

Related U.S. Application Data

(63) Continuation-in-part of application No. 13/794,672, filed on Mar. 11, 2013, now Pat. No. 8,885,086.

(51) Int. Cl.
*H04N 5/222* (2006.01)
*H04N 5/225* (2006.01)
(Continued)

(52) U.S. Cl.
CPC ........ *H04N 5/23293* (2013.01); *H04N 5/2254* (2013.01); *G02B 1/02* (2013.01);
(Continued)

(58) Field of Classification Search
CPC .............. H04N 5/2254; H04N 5/23293; G02B 27/0006; G02B 27/46; G02B 5/3083; G02B 1/02
See application file for complete search history.

(56) References Cited

U.S. PATENT DOCUMENTS

2003/0214729 A1* 11/2003 Wiese ................ G02B 27/0012
                                                                          359/754
2004/0061947 A1*  4/2004 Fujisawa ................ G02B 7/025
                                                                          359/642
(Continued)

*Primary Examiner* — Aung S Moe
*Assistant Examiner* — John H Morehead, III
(74) *Attorney, Agent, or Firm* — Kirton McConkie; Evan R. Witt (57) ABSTRACT

A camera device includes a lens module and a birefringent sapphire lens. The sapphire lens is coupled to the lens module as a light window to protect the lens module. The sapphire lens has a crystal structure and a crystal axis. The crystal structure is a single-crystal structure and the crystal axis is one of c-axis (0001), a-axis [including ($1\bar{2}10$), ($11\bar{2}0$), ($2\bar{1}\bar{1}0$), ($\bar{1}\bar{1}20$), ($\bar{2}110$) and ($\bar{1}2\bar{1}0$)], m-axis [including ($\bar{1}010$), ($\bar{1}100$), ($01\bar{1}0$), ($10\bar{1}0$), ($1\bar{1}00$), and ($0\bar{1}10$)], and r-axis [including ($10\bar{1}1$), ($\bar{1}01\bar{1}$), ($01\bar{1}\bar{1}$), ($0\bar{1}11$), ($\bar{1}\bar{1}0\bar{1}$) and r-axis ($\bar{1}101$)].

5 Claims, 8 Drawing Sheets (51) Int. Cl.
*H04N 5/232* (2006.01)
*G02B 1/02* (2006.01)
*G02B 5/30* (2006.01)
*G02B 27/00* (2006.01)
*G02B 27/46* (2006.01)

(52) U.S. Cl.
CPC ........ *G02B 5/3083* (2013.01); *G02B 27/0006* (2013.01); *G02B 27/46* (2013.01)

(56) References Cited

U.S. PATENT DOCUMENTS

| | | | |
|---|---|---|---|
| 2008/0218597 A1* | 9/2008 | Cho | H04N 5/2351 348/222.1 |
| 2009/0310229 A1* | 12/2009 | Yang | A61B 1/00096 359/694 |
| 2010/0081470 A1* | 4/2010 | Lee | H04M 1/0237 455/556.1 |
| 2011/0317062 A1* | 12/2011 | Fujino | G02B 7/02 348/360 |
| 2012/0001072 A1* | 1/2012 | Toda | H04N 9/045 250/339.05 |
| 2012/0113401 A1* | 5/2012 | Yamazaki | H04N 9/3176 353/101 |
| 2012/0314114 A1* | 12/2012 | Migita | G02B 7/10 348/333.1 |
| 2013/0162891 A1* | 6/2013 | Wang | G02B 7/025 348/360 |
| 2014/0009662 A1* | 1/2014 | Toda | H04N 9/045 348/336 |

* cited by examiner

CAMERA DEVICE AND PROJECTOR DEVICE HAVING PROTECTIVE LENS

CROSS-REFERENCES TO RELATED APPLICATIONS

This is a continuation-in-part of U.S. patent application Ser. No. 13/794,672, filed on Mar. 11, 2013, which is incorporated herewith by reference.

BACKGROUND OF THE INVENTION

1. Field of the Invention

The present invention relates to a camera device and a projector device, especially relates to a camera device and a projector device having a protective lens.

2. The Prior Arts

As the image capturing technology advances, the conventional film camera devices have been replaced by digital cameras, and as the resolution of the digital cameras enhances, the size of the sensing components also becomes smaller. The unit pixels of sensing elements (such as charge-coupled device, CCD, or complementary metal-oxide-semiconductor, CMOS) are arranged in arrays. When the object being filmed has a regular spatial frequency, and when the spatial frequency is larger or equal to half of the sampling frequency of sensing elements, aliasing effect can occur, and further causing the phenomenon of moiré patterns. This effect is not seen in the conventional film camera. The moiré patterns are most likely to be seen in the pictures taken by low grade digital cameras, especially when the objects being filmed are hair or neckties with diagonal stripes. When filming such objects, moiré patterns are more likely to occur in the detailed portion of the picture, thereby resulting in defects or color differences in a photo.

In order to solve the abovementioned problems, quartz is usually used as a birefringent crystal to refract light within the light path in a conventional camera device. The quartz utilized generates two refracted light beams with a difference in their optical path, and the two refracted light beams enter its corresponding unit pixel respectively to eliminate the aliasing effect. However, the quartz has a relatively low rigidity in comparison to sapphire, therefore is not suitable to be placed outside the lens. Besides, placing the quartz in the light path can result in a bulky camera device; therefore, it is only used in the high-end SLR cameras or high-end digital cameras.

Figure 1:
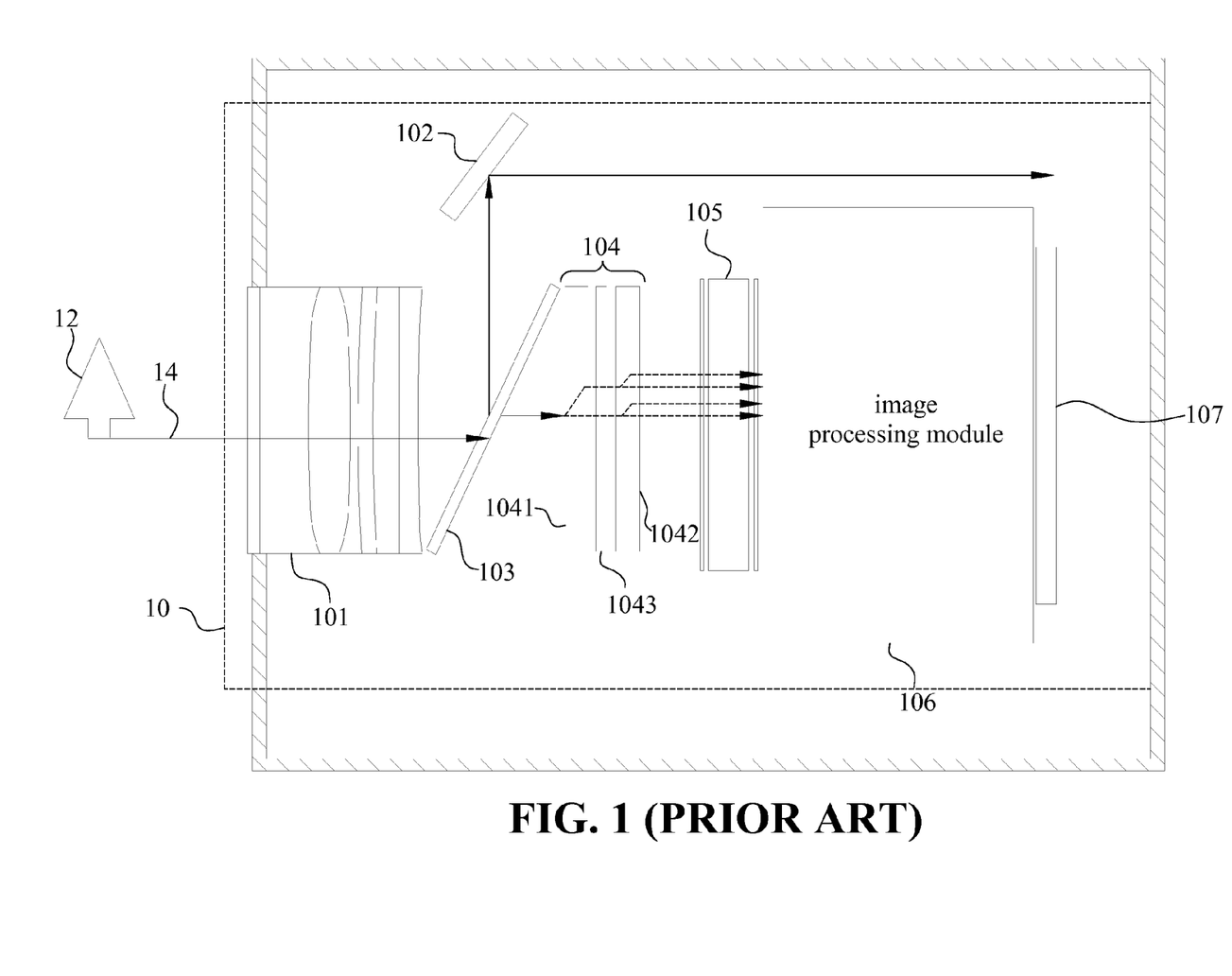
FIG. 1 is a schematic view illustrating a conventional high-end digital camera device (Prior Art)

FIG. 1 is the schematic view illustrating a conventional high-end digital camera device 10. As shown in FIG. 1, the conventional high-end digital camera device includes an optical lens 101, a reflex lens 102, a lens shutter 103, a low pass filter 104, a CMOS image sensing component 105, an image processing module 106, and a liquid crystal display (LCD) 107. The low pass filter 104 also includes a first birefringent lens 1041, a second birefringent lens 1042 and an infrared filter 1043 to block the infrared ray.

The light 14 reflected by an object 12 enters the optical lens 101, and then is reflected by the lens shutter 103 to enter the reflex lens 102. The direction of the light path of the light 14 is then changed, so the direction of the imaging of the object 12 is corrected. When the operator finishes the focusing and setting up the shutter time and the aperture size, the shutter button is pushed to open the lens shutter 103, so that the light 14 can pass through and reaches the low pass filter 104 and sensing component 105 in the rear end. Upon receiving, the sensing component 105 transforms the light 14 into a digital signal, and then the digital signal is processed by the image processing module 106 to output an image to the LCD display 107 for displaying.

In FIG. 1, the first birefringent lens 1041 and the second birefringent lens 1042 are made with quartz, and each lens only has a single light axis. When the light 14 enters the first birefringent lens 1041 and the direction of the light path is not parallel to the single light axis of the first birefringent lens 1041, two refracted light are formed. One of the refracted lights is refracted according to the law of refraction, and is called the ordinary light. The other one of the refracted lights is not refracted according to the law of refraction, therefore is called the extraordinary light. The light 14 is refracted into two parallel lights via the first birefringent lens 1041, so two images offset from each other are formed. Similarly, each of the parallel light is again refracted into two parallel lights via the second birefringent lens 1042, thereby forming more offset images. For the matter of convenience, the ordinary light refracted by the first birefringent lens 1041 is shown as broken lines that are parallel to the light 14 in FIG. 1. The infrared filter 1043 is usually made from a blue glass containing cobalt. The surface of the blue glass is electroplated to block the infrared ray, so as to serve as an infrared filter. Most of the small cameras are not equipped with such components as the infrared filter 1043 because only the high-end cameras have the space and the cost to do so. The low pass filter 104 shown in FIG. 1 is one of the various forms. The optical low pass filter 104 can also be one with single-lens or multiple lenses.

Figure 2:
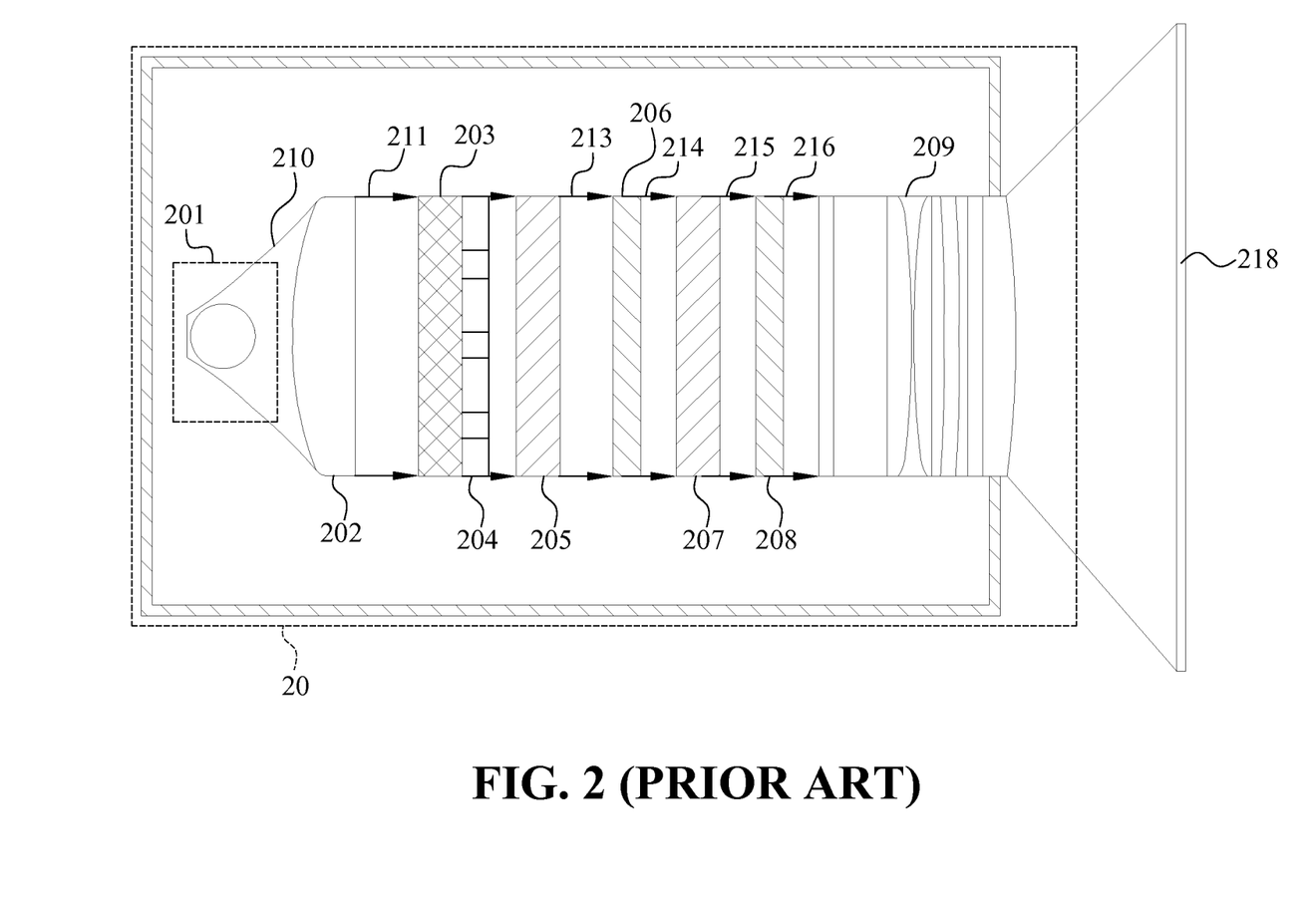
FIG. 2 is a schematic view illustrating a conventional liquid crystal projector device (Prior Art)

FIG. 2 is a schematic view illustrating a conventional liquid crystal projector device 20. The conventional liquid crystal projector device 20 includes a light source assembly 201, a condensing lens 202, a liquid crystal assembly 203, a color filter 204, a ¼ wavelength polarizer 205 and 207, birefringent crystal 206 and 208, and lens assembly 209. The light beam 210 illuminated by the light source assembly 201 enters the condensing lens 202, and is condensed to a certain area. The condensed light beam 210 then enters the liquid crystal assembly 203, which has multiple unit pixels, in which, the brightness of each of the unit pixels is controlled by a control signal (not shown). After the liquid crystal assembly 203 adjusted the brightness of the light beam 211, the light beam 211 then enters the color filter 204, which controls the color of each unit pixel. The delicacy of the color depends on the size of the unit pixel, where the smaller the unit pixels are, the higher the quality of the color becomes.

After passing through the color filter 204, the light beam 211 enters the ¼ wavelength polarizer 205 so as to be transformed into a polarized light beam 213. The polarized light beam 213 then enters the birefringent crystal 206, and is refracted into a birefringent light beam 214. The birefringent light beams 214 are the ordinary light and extraordinary light, which are parallel to each other. Next, the birefringent light beam 214 enters another ¼ wavelength polarizer 207 so as to be transformed into another polarized light beam 215. The polarized light beam 215 then enters yet another birefringent crystal 208, and is refracted into another birefringent light beam 216. With the birefringence property, the birefringent crystal 206 is designed in such a manner that the difference in the optical path created is equal to the distance between the unit pixels, and so is the birefringent crystal 208. In this way, a unit pixel is split into two or four unit pixels to enhance the output image. At last, the birefringent light beam 216 is projected onto a screen 218 via the lens assembly 209 to enlarge the final image.

The birefringent crystal 206 and 208 utilized in the conventional projector eliminates the aliasing effect and hence improves the moiré patter with its birefringence characteristics. The ¼ wavelength polarizer is also used to form the polarized light or to filter the reflected light with its polarizing characteristics. However, just like the first birefringent lens 1041 and the second birefringent lens 1042 in FIG. 1, the birefringent crystal 206 and 208 and the ¼ wavelength polarizer 205 and 207 are not easy to fit into the device when manufacturing the projectors with smaller sizes. The birefringent crystal 206 and 208 and the ¼ wavelength polarizer 205 and 207 are also not suitable to be placed outside the projector due to its low rigidity. Therefore, a new product, which has a smaller size while having all the above advantages is yet to be developed; such new product can be installed in a slim and light camera device or projector device to solve the drawbacks of the conventional devices.

SUMMARY OF THE INVENTION

Due to the above reasons, the primary purpose of the present invention is to redesign the camera device and the projector device with the birefringent sapphire crystal. With the property of birefringence, and also with the characteristic of anti-corrosion, high compressive strength and high rigidity of the sapphire crystal, it is utilized as the protective lens directly. In addition, due to its birefringence property, the sapphire crystal is optically designed and coated to serve both roles of protective lens and optical filter. In this way, the polarizer and the filter in the optical lens assembly are omitted to lower the cost and also reduce the size of the product. With the sapphire lens, both the functionality and the reliability of the product are ensured.

The sapphire crystal is a birefringent crystal with specific axial directions and is suitable to use as a viewing window. Due to its hexagonal crystal structure, when making use of the sapphire crystal, different axial directions of the crystal are chosen according to the reflection angle needed, so the desired effect can be achieved along with right choice of the sapphire crystal thickness. For example, c-axis, a-axis, r-axis and m-axis are used as light windows. With the birefringence property, the right design of the crystal thickness, and the coordination of the sensing components/projector light source and the image processing module, better imaging results are obtained.

According to the above description, a camera device is provided in the present invention, includes a lens module and a sapphire lens. The birefringent sapphire lens is coupled to the lens module to serve as a light incident window and to protect the lens module. The sapphire lens has a crystal structure and a crystal axis, where the crystal structure is a single-crystal structure, and the crystal axis includes one selected from a group consisting of c-axis (0001), a-axis [including (1$\bar{2}$10), (11$\bar{2}$0), (2$\bar{1}\bar{1}$0), ($\bar{1}\bar{1}$20), ($\bar{2}$110) and ($\bar{1}$2$\bar{1}$0)], m-axis [including ($\bar{1}$010), ($\bar{1}$100), (01$\bar{1}$0), (10$\bar{1}$0), (1$\bar{1}$00), and (0$\bar{1}$10)], and r-axis [including (10$\bar{1}$1), ($\bar{1}$01$\bar{1}$), (01$\bar{1}\bar{1}$), (0$\bar{1}$11), (1$\bar{1}$0$\bar{1}$) and r-axis ($\bar{1}$101)].

According to the above description, a camera device is provided in the present invention, includes a lens module and a rotatable protective light window. The rotatable protective light window is rotatably coupled to the lens module to protect the lens module. When the rotatable protective light window and the lens module are at a first relative position, the lens module fetches a specific reflected light. On the other hand, when the rotatable protective light window and the lens module are at a second relative position, the lens module prevents the specific reflected light from entering into the camera device.

According to the above description, a projector device is provided in the present invention, includes a light source, a lens module and a rotatable protective light window. The lens module is illuminated by the light source to generate a working light beam. The rotatable protective light window has the birefringence property, and is coupled to the lens module to serve as a light exit window to protect the lens module. Besides, the rotatable protective light window also receives the working light beam to generate a birefringent light beam.

According to the above description, a camera device is provided in the present invention, includes a lens module and a birefringent lens. The birefringent lens is coupled to the lens module so as to receive an incident light beam and also to split the incident light beam into an ordinary light and an extraordinary light. Under such condition, the resolution of the camera device is enhanced.

The present invention utilizes the sapphire light window on the outer surface of the devices, so the sapphire serves as the protective window and the optical window. With its birefringence characteristic, the excellent mechanical properties and proper optical design, the final imaging produced by the sapphire is much better than the results from conventional devices.

DETAILED DESCRIPTION OF THE PREFERRED EMBODIMENTS

The present invention will be apparent to those skilled in the art by reading the following detailed description of preferred embodiments thereof, with reference to the attached drawings.

Figure 3:
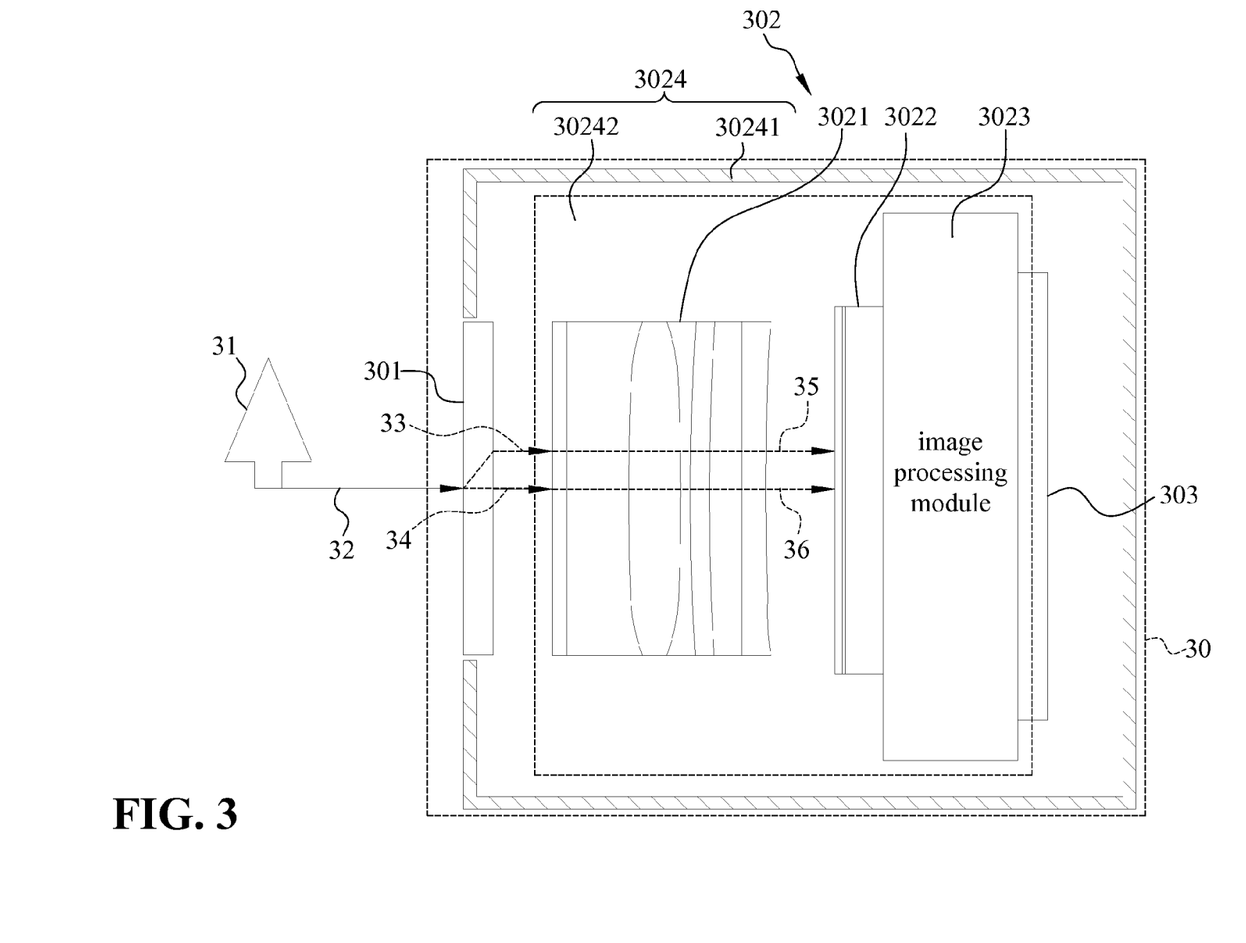
FIG. 3 is a schematic view illustrating a first embodiment of a camera device of the present invention.

FIG. 3 is the schematic view illustrating the first embodiment of the camera device of the present invention. As shown in FIG. 3, the camera device 30 of the present invention includes a sapphire lens 301, a lens module 302 and a flat panel display 303, where the sapphire lens 301 is a light window. The lens module 302 includes an optical lens 3021 and a case 3024. The case 3024 includes an outer housing 30241 and an inner housing 30242. The inner housing 30242 is disposed in the outer housing 30241. The optical lens 3021 is disposed in the inner housing 30242 of the case 3024. The birefringent sapphire lens 301 is coupled to the outer housing 30241 of the case 3024 of the lens module 302 to serve as a light incident window and also to protect the optical lens 3021 of the lens module 302. More specifically, the sapphire lens 301 is adhered to the outer housing 30241 of the case 3024 of the lens module 302 at a first high temperature compared with room temperature by a bonding glue (not shown). The bonding glue is macromolecular glue, which has a bonding reaction at the first high temperature. The macromolecular glue is high-temperature glue, photosensitive glue, or two-component glue. The sapphire lens 301 has a crystal structure and a crystal axis, where the crystal structure is a single-crystal structure, and the crystal axis includes one selected from a group consisting of c-axis (0001), a-axis [including ($1\bar{2}10$), ($11\bar{2}0$), ($2\bar{1}\bar{1}0$), ($\bar{1}\bar{1}20$), ($\bar{2}110$) and ($\bar{1}2\bar{1}0$)], m-axis [including ($\bar{1}010$), ($\bar{1}100$), ($01\bar{1}0$), ($10\bar{1}0$), ($1\bar{1}00$), and ($0\bar{1}10$)], and r-axis [including ($10\bar{1}1$), ($\bar{1}01\bar{1}$), ($01\bar{1}\bar{1}$), ($0\bar{1}11$), ($\bar{1}\bar{1}0\bar{1}$) and r-axis ($\bar{1}101$)]. In addition to the strong mechanical strength, scratch-resistance and corrosion-resistance characteristics, the rigidity of the sapphire is also very high and is only next to the diamonds. Hence, the sapphire is a suitable material for the protective lens of the camera device 30.

In FIG. 3, the incident light 32 from an object 31 includes the sapphire lens 301. The sapphire lens 301 has two optical axes including the c-axis (0001). When designing the sapphire lens 301, the axial direction of the two optical axes are not to be parallel with the incident direction of the incident light 32. When the incident direction of the incident light 32 is not parallel to the optical axis of the sapphire lens 301, the incident light 32 is refracted by the sapphire lens 301 into a first refracted light beam 33 and a second refracted light beam 34, which are offset and parallel to each other.

The lens module 302 includes an image sensing unit 3022 and an image processing module 3023. The optical lens 3021 receives the first refracted light beam 33 and the second refracted light beam 34, so as to form two parallel light beams 35 and 36. The image sensing unit 3021 then transforms the two parallel light beams 35 and 36 into an electronic signal (not visible) for the image processing module 3023 to proceed with later processing.

The image processing module 3023 includes a circuit board (not visible) and a processor (not visible). The circuit board is electrically connected to the image sensing unit 3022. The processor is electrically connected to the circuit board to receive the electronic signal and transform it into an image signal. The flat panel display 303 is also electrically connected to the circuit board, and is in response to the image signal to output a display image on the flat panel display 303.

The sapphire lens 301 has the birefringence characteristic, which is used to eliminate a moiré pattern and the aliasing phenomenon. In addition, the sapphire lens 301 is adapted to be disposed outside the inner housing 30242 of the case 3024 of the lens module 302 to serve as the protective lens. Therefore, devices such as handheld devices are designed into a smaller and thinner form by implementing the sapphire lens 301 as the protective lens. While using the sapphire lens 301 as the protective lens, an infrared filter or an ultraviolet filter is placed between two pieces of sapphire lenses 301 to filter the undesired light rays.

Figure 4:
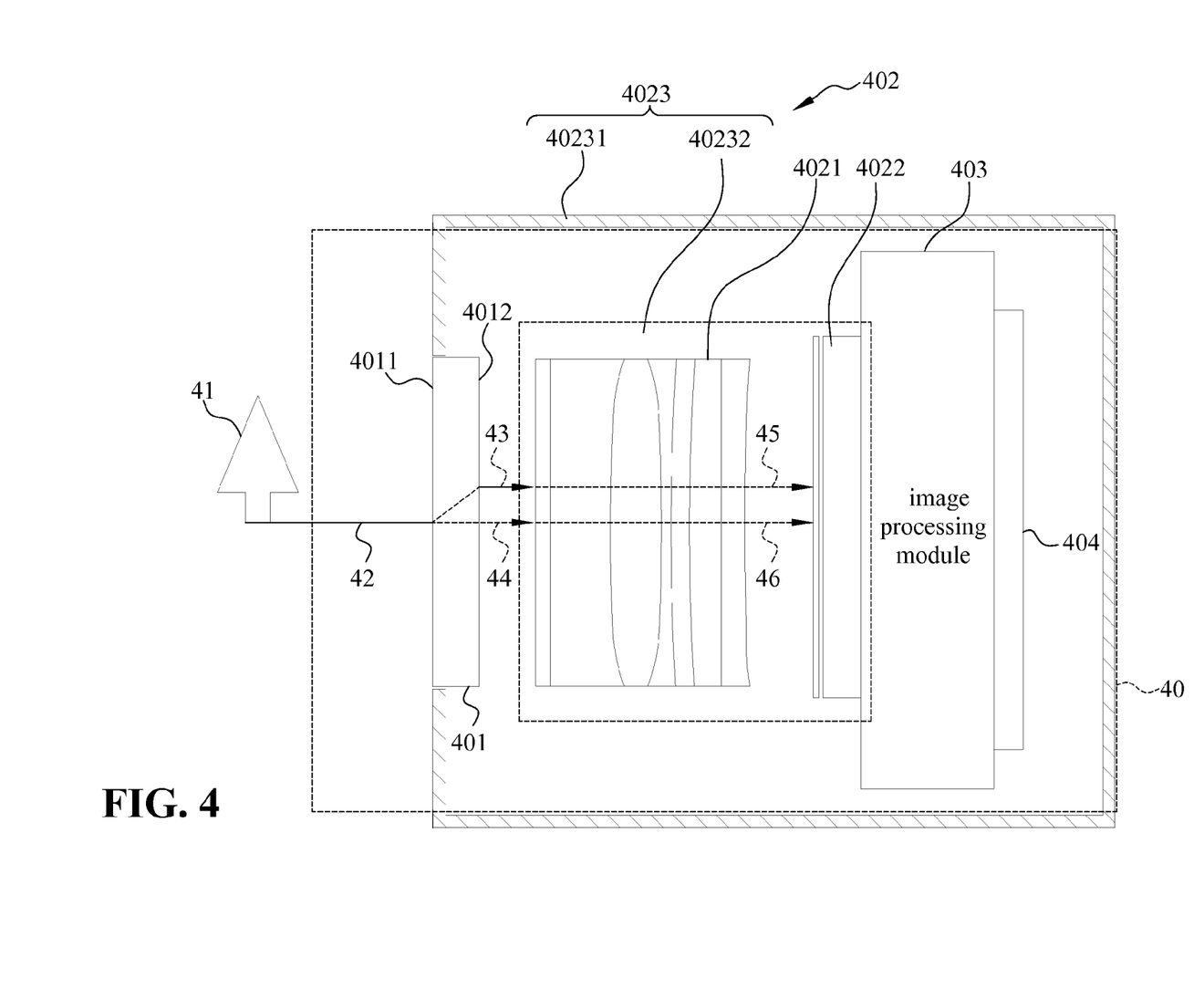
FIG. 4 is a schematic view illustrating a second embodiment of the camera device of the present invention.

FIG. 4 is the schematic view illustrating the second embodiment of the camera device 40 of the present invention. The camera device 40 includes a sapphire lens 401, a lens module 402, an image processing module 403 and a flat panel display 404. The sapphire lens 401 is coupled to the lens module 402 to serve as a light incident window and to protect the lens module 402.

Similar to the first embodiment, in FIG. 4, the incident light 42 from an object 41 includes the sapphire lens 401. The sapphire lens 401 has two optical axes including the c-axis (0001). When designing the sapphire lens 401, the axial direction of the two optical axes are not to be parallel with the incident direction of the incident light 42. When the incident direction of the incident light 42 is not parallel to the optical axis of the sapphire lens 401, the incident light 42 is refracted by the sapphire lens 401 into a first refracted light beam 43 and a second refracted light beam 44, which are offset and parallel to each other.

The lens module 402 includes an optical lens 4021, an image sensing unit 4022, and a case 4023. The case 4023 includes an outer housing 40231 and an inner housing 40232. The inner housing 40232 is disposed in the outer housing 40231. The optical lens 4021 is disposed in the inner housing 40232 of the case 4023 and receives the first refracted light beam 43 and the second refracted light beam 44, so as to form two parallel light beams 45 and 46. The image sensing unit 4021 then transforms the two parallel light beams 45 and 46 into an electronic signal (not visible) for an image processing module 403 to proceed with later processing.

The image processing module 403 includes a circuit board (not visible) and a processor (not visible). The circuit board is electrically connected to the image sensing unit 4022. The processor is electrically connected to the circuit board to receive the electronic signal and transform it into an image signal. A flat panel display 404 is also electrically connected to the circuit, and is in response to the image signal to output a display image on the flat panel display 404.

The sapphire lens 401 includes a first surface 4011 and a second surface 4012. The camera device further comprises at least a coating layer formed on the first surface 4011 of the sapphire lens 401 and an infrared filter or at least a coating layer formed on the second surface 4012. Wherein the coating layer is one or more of an anti-reflective coating, a smudge resistant coating and a fingerprint-resistant coating. Wherein the materials of said anti-reflective coating include silica, titanium dioxide, vanadium pentoxide, niobium pentoxide, or tantalum pentoxide. Wherein the materials of smudge resistant coating include chromium, calcium fluoride, fluorine compounds, fluorocarbonyl silylhydrocarbon compounds, fluorocarbonyl silane compounds, perfluorocarbonyl silylhydrocarbon compounds, perfluoroalkylsilane ether compounds, perfluoroalkylsilane compounds, or chlorine-based perfluoroalkylsilane ether compounds. Wherein the materials of said fingerprint-resistant coating include aluminum, chromium, polytetrafluoroethylene, or fluorocarbon compounds. Wherein the materials of said infrared filter include silica, titanium dioxide, vanadium pentoxide, niobium pentoxide, or tantalum pentoxide. In this case, an anti-reflective coating layer which includes a first semiconductor metal oxide is electroplated on the first surface 4011, where the first semiconductor metal oxide is silica or titanium dioxide. On the other hand, an infrared filter including a second semiconductor metal oxide is electroplated on the second surface 4012, where the second semiconductor metal oxide is silica, vanadium pentoxide, or tantalum pentoxide. In another case, the anti-reflective coating layer and the infrared filter are also formed by thermal deposition, physical sputtering, chemical vapor deposition, or ion beam deposition.

In another preferred embodiment, multiple coating layers are formed on the first surface 4011. For example, a fingerprint-resistant coating layer composed of a metal fluoride or a polymer fluoride is further coated on the anti-reflective coating layer, where the metal fluoride is magnesium fluoride or calcium fluoride.

Figure 5:
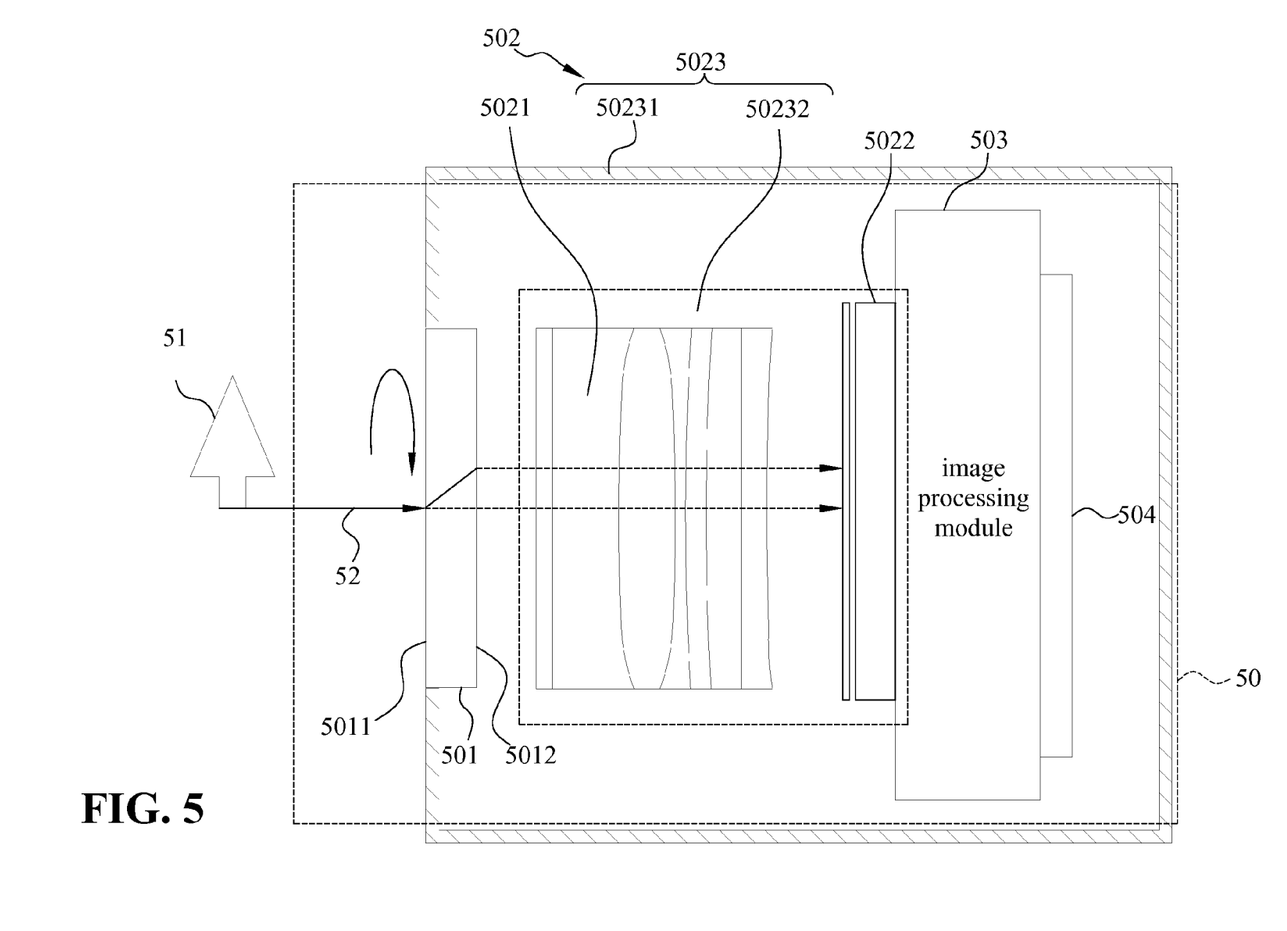
FIG. 5 is a schematic view illustrating a third embodiment of the camera device of the present invention.

FIG. 5 is the schematic view illustrating the third embodiment of the camera device 50 of the present invention. In FIG. 5, the camera device according to the first and second embodiment is improved. The camera device 50 includes a rotatable protective light window 501, a lens module 502, an image processing module 503 and a flat panel display 504. The lens module 502 includes an optical lens 5021, an image sensing unit 5022, and a case 5023. The case 5023 includes an outer housing 50231 and an inner housing 50232. The inner housing 50232 is disposed in the outer housing 50231. The optical lens 5021 is disposed in the inner housing 50232 of the case 5023. In another preferred embodiment, the lens module 502 includes only one optical lens 5021, while the camera device 50 further includes an image sensing unit 5022, which is coupled to the image processing module 503. The rotatable protective light window 501 is rotatably coupled to the outer housing 50231 of the case 5023 of the lens module 502 to protect the lens module 502. When the rotatable protective light window 501 and the lens module 502 are at a first relative position, the lens module 502 fetches a specific reflected light 52. On the other hand, when the rotatable protective light window 501 and the lens module 52 are at a second relative position, the lens module 501 prevents the specific reflected light 52 from entering into the camera device 50. The rotatable protective light window 501 is a birefringent lens made from a sapphire, so the specific reflected light 52 from the object 51 is doubly refracted into an ordinary light and an extraordinary light. The shape of the rotatable protective light window 501 is a round flake. The specific reflected light 52 is reflected by a transparent glass or the water surface.

The rotatable protective light window 501 is a sapphire lens made from a sapphire. Similar to the first and second embodiments of the present invention, the sapphire lens has a crystal structure and a crystal axis. The crystal structure is a single-crystal structure, and the crystal axis includes one selected from a group consisting of c-axis (0001), a-axis [including $(1\bar{2}10)$, $(11\bar{2}0)$, $(2\bar{1}\bar{1}0)$, $(\bar{1}\bar{1}20)$, $(\bar{2}110)$ and $(\bar{1}2\bar{1}0)$], m-axis [including $(\bar{1}010)$, $(\bar{1}100)$, $(01\bar{1}0)$, $(10\bar{1}0)$, $(\bar{1}\bar{1}00)$, and $(0\bar{1}10)$], and r-axis [including $(10\bar{1}1)$, $(\bar{1}01\bar{1})$, $(01\bar{1}\bar{1})$, $(0\bar{1}11)$, $(\bar{1}\bar{1}0\bar{1})$ and r-axis $(\bar{1}101)$]. The sapphire lens includes a first surface 5011 and a second surface 5012. An anti-reflective coating layer is electroplated on the first surface 5011 with a fingerprint-resistant coating on top thereof, and an infrared filter is electroplated on the second surface 5012.

In the third embodiment of the present invention, the reflect direction of the reflected light 52 is changed by rotating the rotatable protective light window 501, which functions as a polarizer. With the rotatable protective light window 501 according to the third embodiment of the present invention, the irregular light beams are filtered and reflected into a directional polarized light beam.

Figure 6:
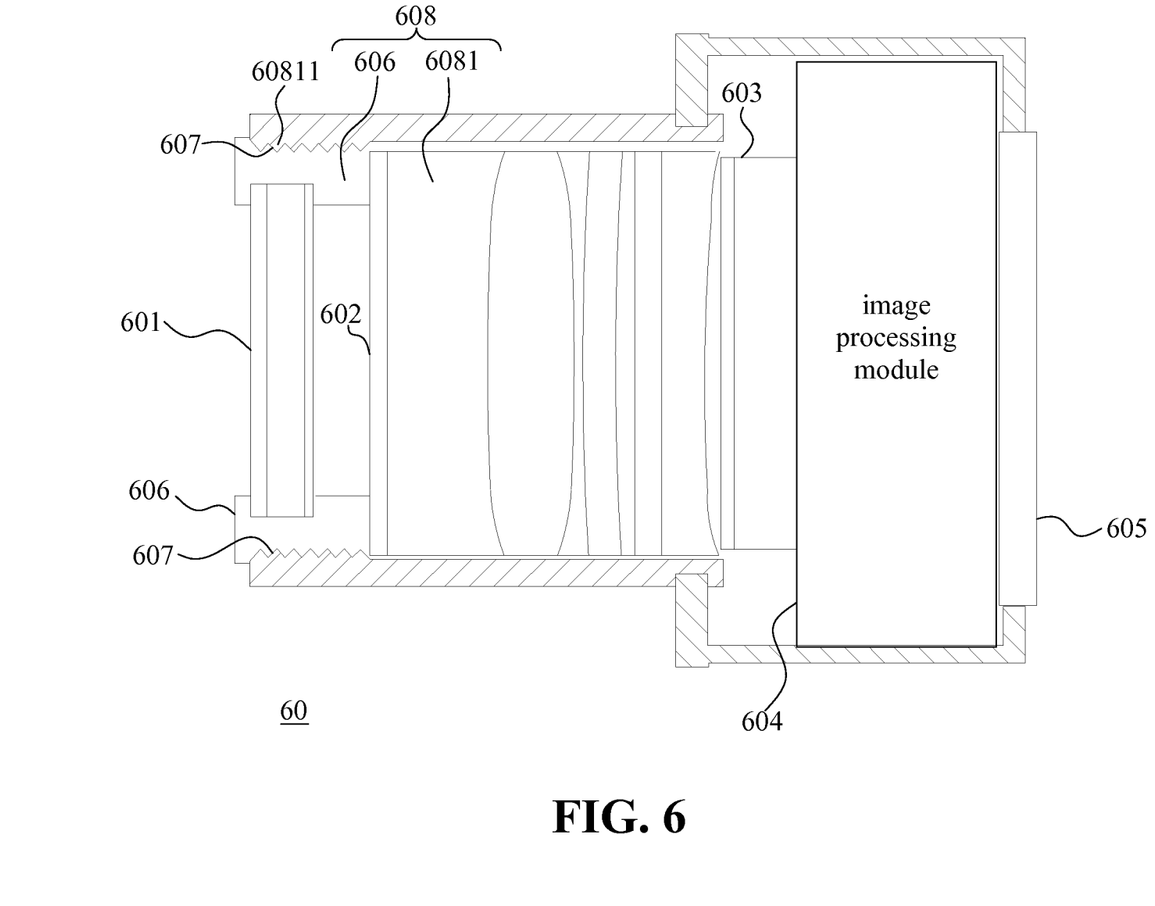
FIG. 6 is a schematic view illustrating a fourth embodiment of the camera device of the present invention

FIG. 6 is the schematic view illustrating the fourth embodiment of the camera device 60 of the present invention. The camera device 60 includes a sapphire lens 601, an optical lens 602, an image sensing unit 603, an image processing module 604 and a flat panel display 605. The structure of the sapphire lens 601 is designed to be detachable and rotatable. The sapphire lens 601 in front of the optical lens 602 is rotated manually or driven by a motor (not shown) to automatically rotate to a suitable relative position before the image capturing. A method for assembling the sapphire lens 601 is shown in FIG. 6. In FIG. 6, the camera device 60 further includes a case 608. The case 608 includes an outer housing 6081 and an annular support 606 as an inner housing, where the sapphire lens 601 is installed on. A predetermined space is reserved within the annular support 606, so that the sapphire lens 601 has enough room to rotate. In addition, the outer housing 6081 has a screw thread 60811, and also a screw thread 607 is formed on the outer peripheral wall of the annular support 606, so the annular support 606 is mounted on the camera device 60 by manually screwing the annular support onto the outer housing 6081 of the case 608 of camera device 60.

Figure 7:
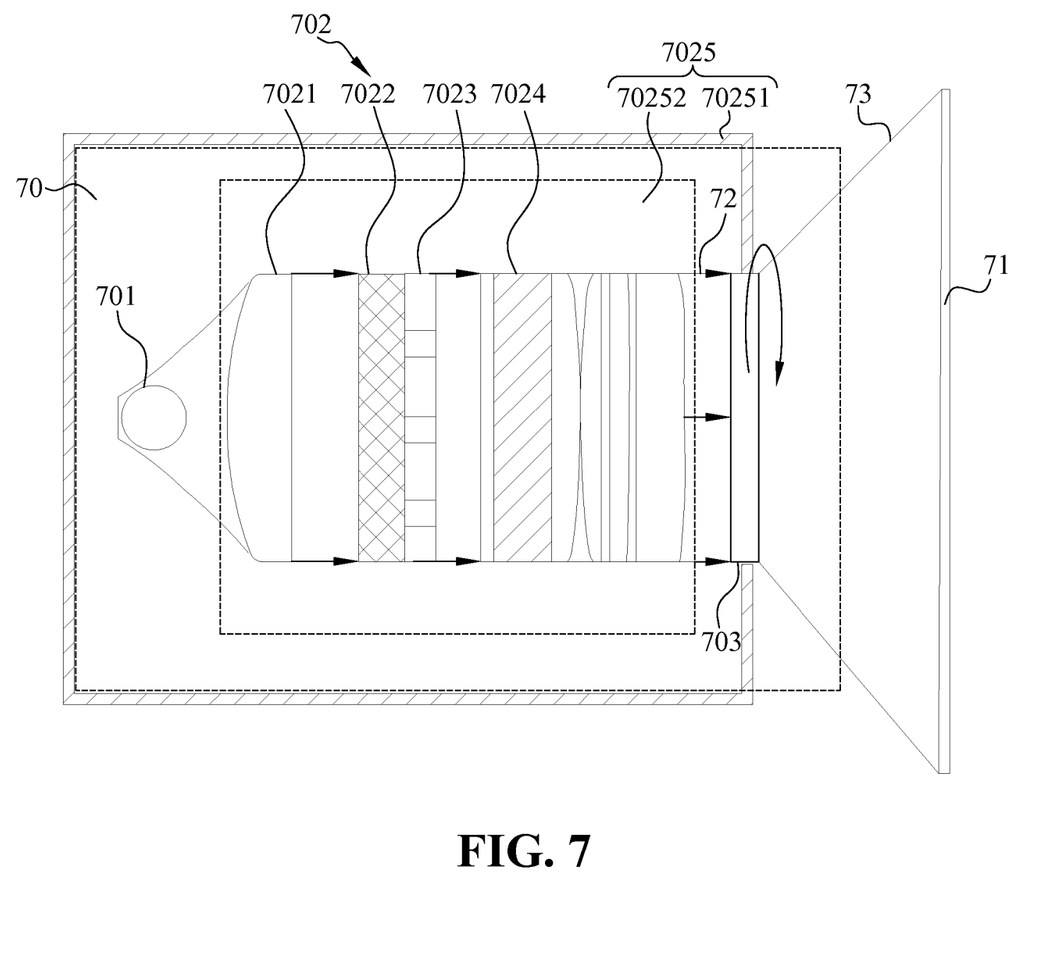
FIG. 7 is a schematic view illustrating a projector device of the present invention.

FIG. 7 is the schematic view illustrating the projector device 70 of the present invention. The projector device 70 includes a light source 701, a lens module 702 and a rotatable protective light window 703. The lens module 702 is illuminated by the light source, thereby generating a working light beam 72. The rotatable protective light window 703 has the birefringence property, and is coupled to the lens module 702 as a light exit window to protect the lens module 702. The working light beam 72 is received by the rotatable protective light window 703, and is refracted into a birefringent light beam 73. The lens module 702 further includes a condensing lens 7021, a liquid crystal layer 7022, a color filter 7023, an optical lens 7024, and a case 7025. The case 7025 includes an outer housing 70251 and an inner housing 70252. The inner housing 70252 is disposed in the outer housing 70251. The condensing lens 7021, the liquid crystal layer 7022, the color filter 7023, the optical lens 7024 are disposed in the inner housing 70252 of the case 7025.

The projector device 70 of the present invention is a digital light processing (DLP) projector device, a liquid crystal on silicon (LCoS) projector device or a liquid crystal display (LCD) projector device.

Similar to the previous embodiments, the rotatable protective light window 703 is a sapphire lens made from a sapphire. The sapphire lens has a crystal structure and a crystal axis, where the crystal structure is a single-crystal structure, and the crystal axis includes one selected from a group consisting of c-axis (0001), a-axis [including $(1\bar{2}10)$, $(11\bar{2}0)$, $(2\bar{1}\bar{1}0)$, $(\bar{1}\bar{1}20)$, $(\bar{2}110)$ and $(\bar{1}2\bar{1}0)$], m-axis [including $(\bar{1}010)$, $(\bar{1}100)$, $(01\bar{1}0)$, $(10\bar{1}0)$, $(\bar{1}\bar{1}00)$, and $(0\bar{1}10)$], and r-axis [including $(10\bar{1}1)$, $(\bar{1}01\bar{1})$, $(01\bar{1}\bar{1})$, $(0\bar{1}11)$, $(\bar{1}\bar{1}01)$ and r-axis $(\bar{1}101)$].

The projector device 70 further includes an automatic rotating structure (not shown), which enables the rotatable protective light window 703 to automatically rotate. The projector 70 device projects an image 71 with a frame rate, and the rotatable protective light window 703 rotates with a rotational frequency, in which, the rotational frequency depends on the frame rate. Preferably, the rotational frequency is larger or equal to the frame rate. With such configuration, when the image 71 projected by the projector device 70 is stationary, the rotational frequency of the rotatable protective light window is zero. In other words, the rotatable protective light window stops rotating. In addition, the birefringence property of the rotatable protective light window 703, which is a sapphire lens, enhances the resolution of the image 71.

Figure 8:
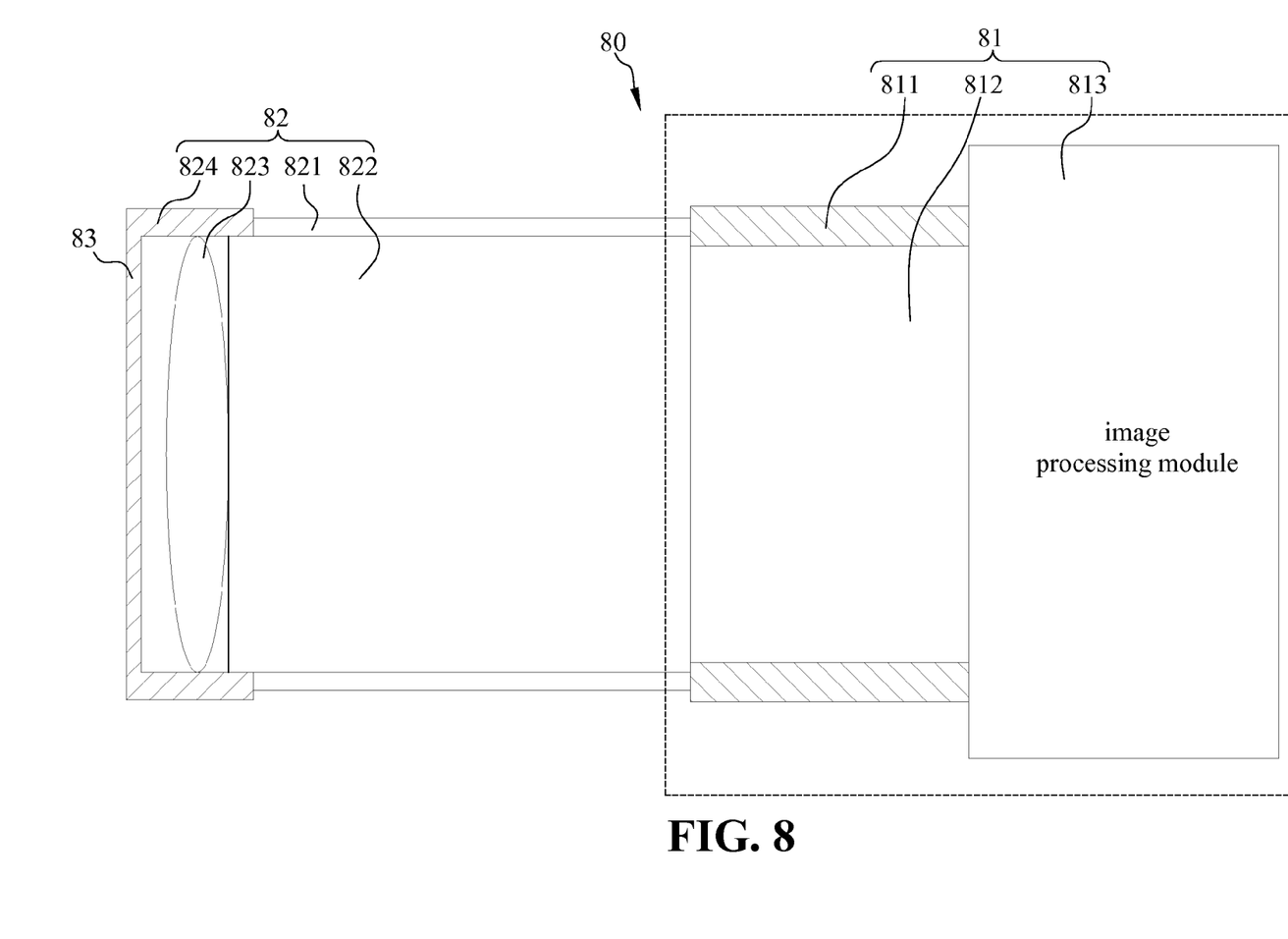
FIG. 8 is a schematic view illustrating a fifth embodiment of the camera device of the present invention.

FIG. 8 is a schematic view illustrating a fifth embodiment of the camera device of the present invention. The camera device 80 comprises a lens module 81, an optical fiber tube module 82, and a birefringent sapphire lens 83.

The lens module 81 includes a first case 811, an image sensing unit 812 and an image processing module 813. The image sensing unit 812 is disposed in the first case 811. The image processing module 813 comprises a circuit board (not shown) and a processor (not shown). The circuit board is electrically connected to the image sensing unit, and the processor is electrically connected to the circuit board.

The optical fiber tube module 82 is coupled to the lens module 81. More specifically, the optical fiber tube module 82 comprises a tube 821, an optical fiber module 822, an optical fiber lens 823, and a second case 824. The tube 821 is coupled between the first and second cases 811 and 824. The optical fiber module 822 is disposed in the tube 821. The optical fiber lens is disposed in the second case 824 and coupled to the optical fiber module 822.

The sapphire lens 83 is coupled to the second case 824 and is outside the optical fiber lens 823, so that the sapphire lens 83 serves as a light incident window and protect the optical fiber lens of the optical fiber tube module 82. The sapphire lens 83 has a crystal structure and a crystal axis, where the crystal structure is a single-crystal structure, and the crystal axis includes one selected from a group consisting of c-axis (0001), a-axis [including ($1\bar{2}10$), ($11\bar{2}0$), ($2\bar{1}\bar{1}0$), ($\bar{1}\bar{1}20$), ($\bar{2}110$) and ($\bar{1}2\bar{1}0$)], and m-axis [including ($\bar{1}010$), ($\bar{1}100$), ($01\bar{1}0$), ($10\bar{1}0$), ($1\bar{1}00$) and ($0\bar{1}10$)], and r-axis [including ($10\bar{1}1$), ($\bar{1}01\bar{1}$), ($01\bar{1}\bar{1}$), ($0\bar{1}11$), ($1\bar{1}0\bar{1}$) and r-axis ($\bar{1}101$)]. In addition to the strong mechanical strength, scratch-resistance and corrosion-resistance characteristics, the rigidity of the sapphire is also very high and is only next to the diamonds. Hence, the sapphire is a suitable material for the protective lens of the camera device 80.

An incident light (not shown) from an object (not shown) includes the sapphire lens 83. The sapphire lens 83 has two optical axes including the c-axis (0001). When designing the sapphire lens 83, the axial direction of the two optical axes are not to be parallel with the incident direction of the incident light. When the incident direction of the incident light is not parallel to the optical axis of the sapphire lens 83, the incident light is refracted by the sapphire lens 83 into a first refracted light beam (not shown) and a second refracted light beam (not shown), which are offset and parallel to each other. The optical fiber tube module 82 receives the first refracted light beam and the second refracted light beam, so as to form two parallel light beams. Then the two parallel light beams are totally internally reflected to the image sensing unit 812 of the lens module 81 by said optical fiber tube module 82. The image sensing unit 812 then transforms the two parallel light beams into an electronic signal (not visible) for the image processing module 813 to proceed with later processing. The processor receives the electronic signal and transforms it into an image signal. Wherein the camera device 80 further comprises a flat panel display (not shown). The flat panel display is electrically connected to the circuit board for outputting a display image according to said image signal.

The sapphire lens 83 has the birefringence characteristic, which is used to eliminate a moiré pattern and the aliasing phenomenon. In addition, the sapphire lens 83 is adapted to be disposed outside the optical fiber lens 823 of the optical fiber tube module 82 to serve as the protective lens. Therefore, devices such as handheld devices are designed into a smaller and thinner form by implementing the sapphire lens 83 as the protective lens. While using the sapphire lens 83 as the protective lens, an infrared filter or an ultraviolet filter is placed between two pieces of sapphire lenses 83 to filter the undesired light rays.

The preferred embodiments described above are disclosed for illustrative purpose but to limit the modifications and variations of the present invention. Thus, any modifications and variations made without departing from the spirit and scope of the invention should still be covered by the scope of this invention as disclosed in the accompanying claims.

What is claimed is:

1. A camera device, comprising:
a lens module including an optical lens, a case, an image sensing unit, and an image processing module, said optical lens disposed in said case, said image processing module comprising a circuit board and a processor, said circuit board electrically connected to said image sensing unit, the processor electrically connected to said circuit board;
a birefringent sapphire lens coupled to said case of said lens module to serve as a light incident window and to protect said optical lens of said lens module, said sapphire lens having a crystal structure and a crystal axis, wherein said crystal structure is a single-crystal structure and said crystal axis includes one selected from a group consisting of c-axis, a-axis, m-axis and r-axis, wherein said c-axis is c-axis (0001), said a-axis is one of the a-axis ($1\bar{2}10$), a-axis ($11\bar{2}0$), a-axis ($2\bar{1}\bar{1}0$), a-axis ($\bar{1}\bar{1}20$), a-axis ($\bar{2}110$) and a-axis ($\bar{1}2\bar{1}0$), said m-axis is one of the m-axis ($\bar{1}010$), m-axis ($\bar{1}100$), m-axis ($01\bar{1}0$), m-axis ($10\bar{1}0$), m-axis ($1\bar{1}00$), m-axis ($0\bar{1}10$), said r-axis is one of the r-axis ($10\bar{1}1$), r-axis ($\bar{1}01\bar{1}$), r-axis ($01\bar{1}\bar{1}$), r-axis ($0\bar{1}11$), r-axis ($1\bar{1}0\bar{1}$) and r-axis ($\bar{1}101$), wherein said sapphire lens has two optical axes; wherein, when a direction of an incident light entering said sapphire lens is not parallel to any of said two optical axes, said sapphire lens responses to said incident light by refracting said incident light into a first refracted light beam and a second refracted light beam, in which, said c-axis (0001) is one of said two optical axes, and a moiré pattern is eliminated by the birefringent property of said sapphire lens; wherein said optical lens of said lens module receives said first refracted light beam and said second refracted light beam to form two parallel light beams, said image sensing unit transforms said two parallel light beams into an electronic signal, and said processor receives said electronic signal and transforms said electronic signal into an image signal;
wherein said sapphire lens is adhered to said case of said lens module at a first high temperature compared with room temperature by a bonding glue; and
a flat panel display electrically connected to said circuit board for outputting a display image according to said image signal.

2. A camera device, comprising:
a lens module including an optical lens, a case, an image sensing unit, and an image processing module, said optical lens disposed in said case, said image processing module comprising a circuit board and a processor, said circuit board electrically connected to said image sensing unit, the processor electrically connected to said circuit board;
a birefringent sapphire lens coupled to said case of said lens module to serve as a light incident window and to protect said optical lens of said lens module, said sapphire lens having a crystal structure and a crystal axis, wherein said crystal structure is a single-crystal structure and said crystal axis includes one selected from a group consisting of c-axis, a-axis, m-axis and r-axis, wherein said c-axis is c-axis (0001), said a-axis is one of the a-axis ($1\bar{2}10$) a-axis ($11\bar{2}0$), a-axis ($2\bar{1}\bar{1}0$), a-axis ($\bar{1}\bar{1}20$), a-axis ($\bar{2}110$) and a-axis ($\bar{1}2\bar{1}0$), said m-axis is one of the m-axis ($\bar{1}010$), m-axis ($\bar{1}100$), m-axis ($01\bar{1}0$), m-axis ($10\bar{1}0$), m-axis ($1\bar{1}00$), m-axis ($0\bar{1}10$), said r-axis is one of the r-axis ($10\bar{1}1$), r-axis ($\bar{1}01\bar{1}$), r-axis ($01\bar{1}\bar{1}$), r-axis ($0\bar{1}11$), r-axis ($1\bar{1}0\bar{1}$) and r-axis ($\bar{1}101$), wherein said sapphire lens has two optical axes; wherein, when a direction of an incident light entering said sapphire lens is not parallel to any of said two optical axes, said sapphire lens responses to said incident light by refracting said incident light into a first refracted light beam and a second refracted light beam, in which, said c-axis (0001) is one of said two optical axes, and a moiré pattern is eliminated by the birefringent property of said sapphire lens; wherein said optical lens of said lens module receives said first refracted light beam and said second refracted light beam to form two parallel light beams, said image sensing unit transforms said two parallel light beams into an electronic signal, and said processor receives said electronic signal and transforms said electronic signal into an image signal;

wherein said sapphire lens is adhered to said case of said lens module at a first high temperature compared with room temperature by a bonding glue; and a flat panel display electrically connected to said circuit board for outputting a display image according to said image signal;

wherein said sapphire lens includes a first surface and a second surface; the camera device further comprising:

at least a first coating layer formed on said first surface; and an infrared filter or at least a second coating layer formed on said second surface;

wherein the first coating layer and the second is one or more of an anti-reflective coating, a smudge resistant coating and a fingerprint-resistant coating; wherein the materials of said anti-reflective coating include silica, titanium dioxide, vanadium pentoxide, niobium pentoxide, or tantalum pentoxide;

wherein the materials of contamination resistant coating include chromium, calcium fluoride, fluorine compounds, fluorocarbonyl silylhydrocarbon compounds, fluorocarbonyl silane compounds, perfluorocarbonyl silylhydrocarbon compounds, perfluoroalkylsilane ether compounds, perfluoroalkylsilane compounds, or chlorine-based perfluoroalkylsilane ether compounds;

wherein the materials of said fingerprint-resistant coating include aluminum, chromium, polytetrafluoroethylene, or fluorocarbon compounds;

wherein the materials of said infrared filter include silica, titanium dioxide, vanadium pentoxide, niobium pentoxide, or tantalum pentoxide;

wherein the anti-reflective coating and the infrared filter are formed by thermal deposition, physical sputtering, chemical vapor deposition, or ion beam deposition.

3. The camera device as claimed in claim 1, wherein the bonding glue is macromolecular glue, said macromolecular glue has a bonding reaction at said first high temperature.

4. The camera device as claimed in claim 3, wherein said macromolecular glue is a high-temperature glue, photosensitive glue, or two-component glue.

5. A camera device, comprising:
a lens module;
an optical fiber tube module coupled to said lens module; and
a birefringent sapphire lens coupled to said optical fiber tube module to serve as a light incident window and to protect said optical fiber tube module, said sapphire lens having a crystal structure and a crystal axis, wherein said crystal structure is a single-crystal structure and said crystal axis includes one selected from a group consisting of c-axis, a-axis, m-axis and r-axis, wherein said c-axis is c-axis (0001), said a-axis is one of the a-axis ($1\bar{2}10$), a-axis ($11\bar{2}0$), a-axis ($2\bar{1}\bar{1}0$), a-axis ($\bar{1}\bar{1}20$), a-axis ($\bar{2}110$) and a-axis ($\bar{1}2\bar{1}0$), said m-axis is one of the m-axis ($\bar{1}010$), m-axis ($\bar{1}100$), m-axis ($01\bar{1}0$), m-axis ($10\bar{1}0$), m-axis ($1\bar{1}00$), m-axis ($0\bar{1}10$), said r-axis is one of the r-axis ($10\bar{1}1$), r-axis ($\bar{1}01\bar{1}$), r-axis ($01\bar{1}\bar{1}$), r-axis ($0\bar{1}11$), r-axis ($1\bar{1}0\bar{1}$) and r-axis ($\bar{1}101$);

wherein said lens module includes an image sensing unit and an image processing module, the image processing module comprises a circuit board and a processor, the circuit board electrically connected to said image sensing unit, the processor electrically connected to said circuit board;

wherein said sapphire lens has two optical axes; wherein, when a direction of an incident light entering said sapphire lens is not parallel to any of said two optical axes, said sapphire lens responses to said incident light by refracting said incident light into a first refracted light beam and a second refracted light beam, in which, said c-axis (0001) is one of said two optical axes, and a moiré pattern is eliminated by the birefringent property of said sapphire lens;

wherein said optical fiber tube module receives said first refracted light beam and said second refracted light beam to form two parallel light beams, said two parallel light beams are totally internally reflected to said lens module by said optical fiber tube module, said image sensing unit transforms said two parallel light beams into an electronic signal, and said processor receives said electronic signal and transforms said electronic signal into an image signal;

wherein the camera device further comprises a flat panel display, said flat panel display is electrically connected to said circuit board for outputting a display image according to said image signal; and wherein said lens module includes a first case, said image sensing unit is disposed in the first case, said optical fiber tube module comprises a tube, an optical fiber module, an optical fiber lens, and a second case, said tube is coupled between said first and second cases, said optical module is disposed in said tube, said optical fiber lens is disposed in said second case and coupled to said optical fiber module, said sapphire lens is coupled to said second case and is outside said optical fiber lens, so that said sapphire lens serve as a light incident window and protects said optical fiber lens of said optical fiber module.

* * * * *